INVENTOR:
S. W. LEVINE
BY
Homer R. Montague
ATT'Y.

INVENTOR:
S. W. LEVINE
BY
Homer R. Montague
ATT'Y.

May 9, 1961 S. W. LEVINE 2,983,785

VARIABLE-PERIOD DRIVE FOR ELECTRONIC LINE SCAN AND RECORDING MACHINES

Filed May 20, 1958 3 Sheets-Sheet 3

INVENTOR:
S. W. LEVINE
BY
Homer R. Montague
ATTY

United States Patent Office 2,983,785

Patented May 9, 1961

2,983,785

VARIABLE-PERIOD DRIVE FOR ELECTRONIC LINE SCAN AND RECORDING MACHINES

Samuel W. Levine, Westbury, N.Y., assignor to Fairchild Camera and Instrument Corporation, a corporation of Delaware Filed May 20, 1958, Ser. No. 736,611

12 Claims. (Cl. 178—6.6)

This invention pertains generally to an apparatus for the electrical reproduction of images, and more specifically to such an apparatus in which the reproduction may selectively be an enlargement or a reduction of the original image, and in a selectable ratio in either case.

While not limited thereto, the inventive concept of the present invention will be described in connection with the art of photoelectric engraving and recording machines. The particular type of photoelectric machine to which this invention is most applicable usually comprises a pair of rotary drums having a common source of motive power for achieving synchronous rotary motion of the two drums. One of the drums includes means for releasably securing thereto a sheet or the like which bears the image to be reproduced. Mounted adjacent this drum for sliding motion parallel to the axis thereof is a photoelectric transducer which serves to scan the image and produce electrical signals corresponding to the image information. The other drum includes means for releasably securing thereto a sheet of recording material. Mounted adjacent this second drum for sliding motion parallel to the axis thereof is an output transducer which is electrically connected to the photoelectric pick-up transducer to receive signals therefrom and which serves to record the image on the recording sheet on the second drum. The nature of the recording device is a matter of choice, and it may comprise a heated stylus for vertical relief engraving of the recording sheet, a source of light and a light valve for photographic reproduction, or any other suitable means.

In order to provide synchronous motion of the two transducers axially of the two drums, a common drive means for the transducers is connected to the aforementioned motive power source. This common drive means may conveniently take the form of an endless belt for some suitable relatively inextensible material such as steel, the belt being secured to the two transducers and passing over and extending between a pair of pulleys or wheels at least one of which is rotated by the motive source. Such an apparatus forms the subject matter of U.S. Reissue Patent Number Re. 23,914 to J. A. Boyajean and assigned to the assignee of the present invention. As disclosed in this prior patent, suitable means may be prodvided for inserting a "screen" signal in the information supplied to the output transducer whereby a half-tone reproduction is achieved.

As disclosed in the aforementioned patent, however, the ratio of reproduction between the image on the one drum and the reproduction on the other drum is fixed at unity.

It is therefore a primary object of the present invention to provide an apparatus for the electrical reproduction of images wherein the ratio of reproduction may be unity or values which are greater or less than unity by amounts within the design limits of a given machine.

It is a further object of the invention to provide an apparatus for the electrical reproduction of images wherein manual adjustment of the apparatus for a desired ratio of reproduction in one of two mutually orthogonal directions on the image surface automatically adjusts the operation of the apparatus for the same ratio of reproduction in the other direction.

Another object of the invention is to provide an apparatus for the electrical reproduction of images wherein the ratio of reproduction in one of two mutually orthogonal directions on the image surface may selectively differ from that in the other direction.

Still another object of the invention is to provide an apparatus for the electrical reproduction of images wherein the image as reproduced may selectively be a direct or mirror copy of the original image, irrespective of the size ratio between the original and reproduced images.

In accordance with the present invention, the above and other objects are achieved by means of an apparatus which includes a pair of rotary cylindrical drums which are rotated in timed relation and which respectively carry an original copy or image-bearing sheet and the recording sheet. Adjacent each of these drums is an image-information transducer, one of which scans the image or original copy sheet and provides an output signal corresponding to such information. The other transducer receives this signal after suitable amplification and records the information on the recording sheet.

In order to provide the scanning motion of the two transducers in directions parallel to the axes of the respective drums, the apparatus of the present invention includes one or more translational drive means each of which may conveniently take the form of an endless tape or belt of some relatively inextensible material such as steel or the like. Where only one such belt is employed, one of the transducers is permanently secured thereto for continuous motion along the associated drum as the belt is moved in timed relation to the rotation of the drums. The other transducer is adapted to be clamped to the drive belt during selectable portions of each cycle of rotation of the drums, thereby effecting slower translational movement of the second transducer over a period of several such rotational cycles than would otherwise obtain had the transducer been continuously engaged to the drive belt. By controlling the portion of each rotational cycle during which the second transducer is clamped to the drive means, the recorded image is correspondingly enlarged in the axial direction of the drums.

Where it is desired that the reproduced image be a reduction of the original copy, the second transducer is periodically clamped to a second drive belt which is driven by the first but at a greater rate.

In order to achieve corresponding enlargement or reduction of the original image in the other direction, that is, in the direction around the periphery of the drum, the apparatus of the present invention provides for the use of a plurality of drums of differing diameters in association with one of the transducers. In connection with the use of these various drums, as the apparatus is adjusted to accommodate each different size, the proportionate amount of time during which the second transducer will be clamped to its drive belt is automatically adjusted.

With the above considerations and objects in mind, the invention itself will now be described in connection with a preferred embodiment thereof given by way of example and not of limitation, and with reference to the accompanying drawings, in which.

Figure 1:
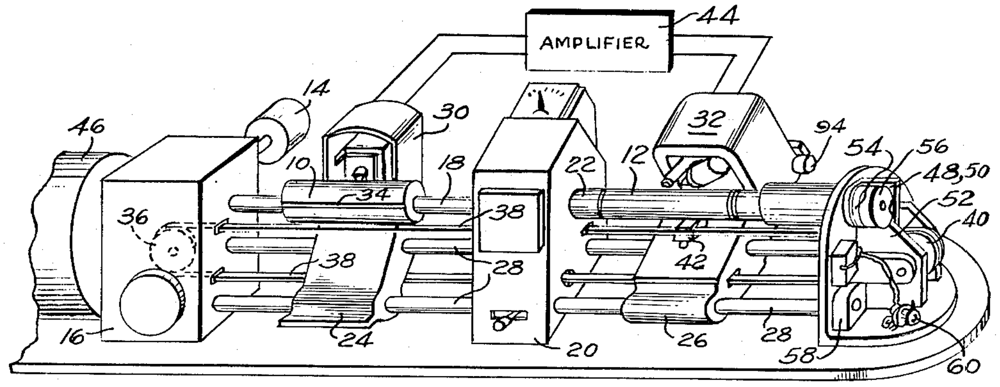
Fig. 1 is a perspective view of the apparatus of the invention, showing the operative relationship between the several components thereof.

Referring now to Fig. 1, a pair of rotary cylindrical drums 10 and 12 are shown mounted for rotation about a common axis. A motor 14, which may be of any suitable type, provides the rotary motion for drum 10 through gearing enclosed within gearbox 16 and for drum 12 through axle 18, clutch means included within housing 20 and a shaft 22. The drum 12 is releasably secured to shaft 22 in a manner which will be described in connection with a later figure of the drawings.

A pair of carriages 24 and 26 are mounted for sliding motion along bars 28 in a direction substantially parallel to the axes of the drums 10 and 12. Mounted on carriage 24 is a transducer indicated generally at 30, which is shown as the recording or engraving transducer in Fig. 1. Transducer 30 is securely attached to carriage 24 so that the two move as a unit when the apparatus is in operation. Mounted on carriage 26 is another transducer indicated generally at 32 and shown as the sensing or pick-up transducer in Fig. 1. Correspondingly, the sheet material which is to be attached to drum 10 is the engraving or recording sheet, while that to be attached to drum 12 is the image-bearing original copy sheet. Any suitable means for releasably securing such sheet material to the drums may be utilized, and one example of such means is the slotted portion 34 in the surface of drum 10 which allows the edges of the sheet material to pass toward the center of the drum to be gripped by means similar to those shown and described in the copending application to Reuben J. Autere et al., Serial Number 559,023, filed January 13, 1956, and assigned to the assignee of the present invention.

Motor 14 also rotates a drive wheel or pulley 36 over which passes an endless belt or tape 38. The two reaches of belt 38 extend along the two drums and terminate as the belt passes around idler pulley 40 at the opposite end of the machine. Carriage 24 is securely attached to the upper reach of belt 38 and is thus pulled along rods 28 as the motor 14 causes rotation of drive wheel 36. Carriage 26, on the other hand, carries a plurality of clamping means as will later be described but one of which is indicated generally at 42 in Fig. 1, and is carried along rods 28 only while belt 38 is engaged by one of the clamping means.

While the transducer means 32 may be of any suitable type, it is indicated herein Fig. 1 as a light source and a cooperating photocell or the like whereby the differing tonal values of a photograph or similar copy material on drum 12 are converted into electrical signals of corresponding amplitudes. These signals are suitably amplified by an amplifier indicated at 44 and then applied to transducer 30. The latter transducer may be any of several suitable types; for example, the input signals may cause a heated stylus to be driven into an engraving sheet on drum 10 to various depths corresponding to the amplitudes of the signals to produce an engraving in vertical relief, or transducer 30 may comprise any of the well-known photographic, magnetic or other recording heads commercially available.

Where a half-tone reproduction is desired, a suitable screen signal is introduced into the image-information signal circuitry by means not shown to moduate the signals therein in accordance with the desired screen. Housing 46 includes a tone generator for producing a screen signal which is synchronous with the rotation of the drums.

With the exception of the means for clamping the transducer 32 to either of the reaches of belt 38, the structure so far described herein is for the most part closely similar to the apparatus forming the subject matter of the aforementioned Boyajean patent, and the operation thereof, aside from this intermittent gripping feature, is substantially that of the Boyajean apparatus. The image-information circuitry is shown in an abbreviated schematic form herein, mostly to indicate the fact of electrical continuity between the sensing transducer 32 and the recording or reproducing transducer 30 through amplifier 44. The details of such circuitry are shown and described in the Boyajean patent, and further description in this specification will not be had since such circuitry forms only an incidental part of the invention herein disclosed.

In addition to the translational movement of transducer 32 in a direction substantially parallel to the axis of drum 12, the transducer is also mounted for translational movement in a direction substantially perpendicular to the first motion. This is to say, transducer 32 is mounted on carriage 26 for sliding motion relative thereto, in order to accommodate the several different diameters of drums 12 which may be placed upon shaft 22. As will be described, movement of transducer 32 relative to carriage 26 causes selective operation of a plurality of electrical switches which take part in the automatic control of the amount of time during each cycle of rotation of drum 12 that carriage 26 is clamped to belt 38 in order to achieve corresponding amounts of reduction or enlargement both in a direction parallel to the axis of the drum and in a direction around the periphery of the drum.

A pair of electrical switches 48 and 50 are mounted on a housing wall 52 which also serves as the support for the rotary wheel or pulley 40. The respective cam operators 54 and 56 for switches 48 and 50 are mounted on the end of rotary shaft 22. Mounted nearby are a switch 58 for determining the direction of travel of carriage 26 and a selector switch 60 for manual selection of the amount of time during which carriage 26 is clamped to tape or belt 38.

Figure 2:
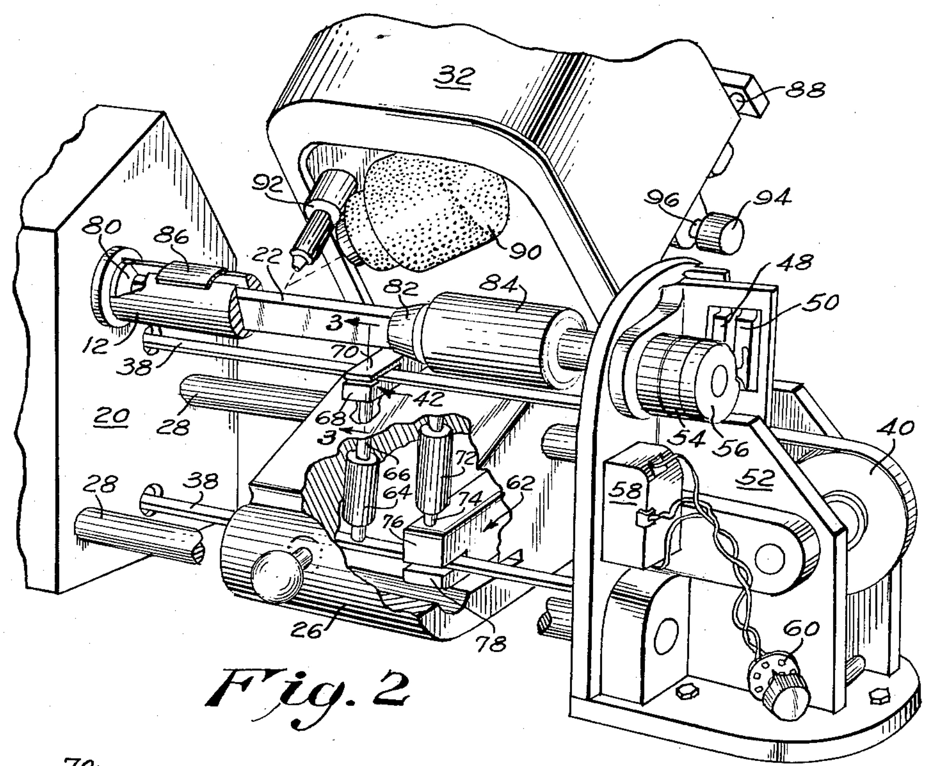
Fig. 2 is a perspective view of a portion of the apparatus shown in Fig. 1, portions being broken away for clarity.

Referring now to Fig. 2, clamping means 42 is shown in greater detail, along with a second and similar clamping means 62. Clamping means 42 included a solenoid 64 with an associated armature or shaft 66 which is free for reciprocal movement within the clamping head whose jaws 68 and 70 form a mouth through which the upper reach of belt 38 passes. Both the solenoid 64 and the clamping head of clamping means 42 are fixedly secured to carriage 26, so that when solenoid 64 is energized and shaft 66 engages belt 38 (as will be described), carriage 26 is carried along with the movement of belt 38. Similarly, clamping means 62 includes a solenoid 72 and a cooperating armature or shaft 74 which is free for reciprocal movement within the clamping head whose jaws 76 and 78 form a mouth through which passes the lower reach of belt 38. When solenoid 72 is energized, carriage 26 is clamped to the lower reach of belt 38 and is carried along with the belt in a direction opposite from that product by energization of solenoid 64.

As may be seen in Fig. 2, the central portion of shaft 22 is rectangular in cross-section, rather than circular, in order to provide for the convenient mounting of any of a plurality of drums 12 of differing outer diameters. The drums themselves, one of which is shown in place but partly broken away, are slotted as shown to fit over the flat portion of shaft 22. The ends of each such drum 12 present conical hollowed-out portions to the conical mounting means 80 and 82. Mounting means 80 is fixed relative to shaft 22, but mount 82 is secured to sleeve 84 which is mounted for relative sliding motion in the axial direction of shaft 22, being spring-loaded by means not shown to urge mounting means 82 to the left as viewed in Fig. 2. Any suitable means may be employed in connection with drum 12 to releasably secure thereto a sheet of image-bearing material. One form of such securing means is indicated in Fig. 2 as a bar 86 or the like which is held in position by spring clips not shown but most conveniently secured to drum 12 at the ends thereof. It will be understood that the sheet material would first be placed upon the drum with the ends thereof extending into the slot which receives shaft 22. While the material is held in this position, the bar 86 is snapped into place on the drum, and the sheet material is thereby clamped to the drum.

Figure 9:
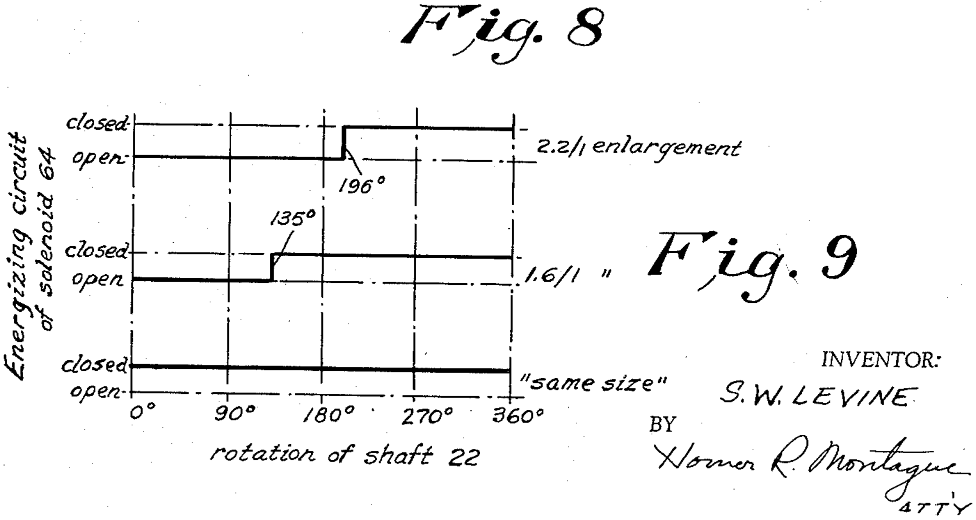
Fig. 9 is a graphical diagram showing the open and closed periods of a solenoid energizing circuit for specified degrees of enlargement in the reproduction.

The rotary cams 54 and 56 first mentioned in connection with Fig. 1 are better shown in Fig. 2, along with their respective cooperating switches 48 and 50. As stated previously, the cams have differing cam-surface lengths, and as shaft 22 rotates, the cams also rotate, and switches 48 and 50 are operated by the respective cams through differing percentages of the period of time taken up by a complete rotation of shaft 22. Fig. 9 shows graphically the relative open and closed periods of the circuit for solenoid 64, during each rotation of shaft 22, for three exemplary reproduction ratios. The enlargement ratio is the ratio of 360 degrees (one turn of shaft 22 to the angular portion of a rotation during which the solenoid 64 is energized; i.e., for the 2.2 to 1 ratio, 360/(360–196), and so on.

Transducer 32 is mounted on carriage 26 for relative sliding motion by means of a plurality of rods 88, only one of which is visible in Fig. 2. The reason for this sliding mount on carriage 26 is evident, since the intersection of the axis of the light beam issuing from light source 90 and the axis of the photocell optical system 92 is fixed with respect to transducer 32. As drums 12 of larger diameter are placed upon shaft 22, transducer 32 must be moved along rods 88 away from the drum in order to keep the aforementioned intersection at the surface of the drum. Conversely, when smaller diameter drums are employed, transducer 32 must be moved closer to shaft 22. Once transducer 32 is suitably positioned for a given drum size, the knurled knob 94 may be rotated to cause a threaded member 96 attached thereto and carried by transducer 32 to engage the adjacent rod 88.

Figure 3:
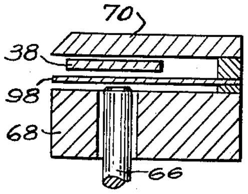
Fig. 3 is a sectional view of one of the clamping elements shown in Fig. 2.

Fig. 3 shows in detail the clamping head of clamp means 42. The jaws 68 and 70 form a mouth through which passes the upper reach of belt 38 as stated above. Shaft or armature 66 which is reciprocally driven by solenoid 64 (Fig. 2) is free within an aperture in jaw 68 for relative reciprocal movement therein in order to allow the upper end of the shaft to effect clamping to the belt 38. If the shaft 66 were to bear directly against belt 38, the shaft would be subjected to a transverse pull by the belt. Such operation not only decreases the accuracy of timing of the period during which the clamp is effected and of the actual amplitude of movement of carriage 26, but would eventually cause wearing of the parts until every semblance of accuracy would be lost. In order to avoid such problems, an interleaf 98 is employed, being positioned between the upper end of shaft 66 and the belt 38. Interleaf 98 is resilient and is attached to the clamp head at the closed end of the mouth formed by jaws 68 and 70. Thus, as shaft 66 is thrust upwardly to effect a clamping to belt 38, the upper end of the shaft strikes interleaf 98 and the latter clamps belt 38 against jaw 70. It will be understood that the construction of the clamp head of clamping means 62 is similar to that just described in connection with clamping means 42.

Figure 4:
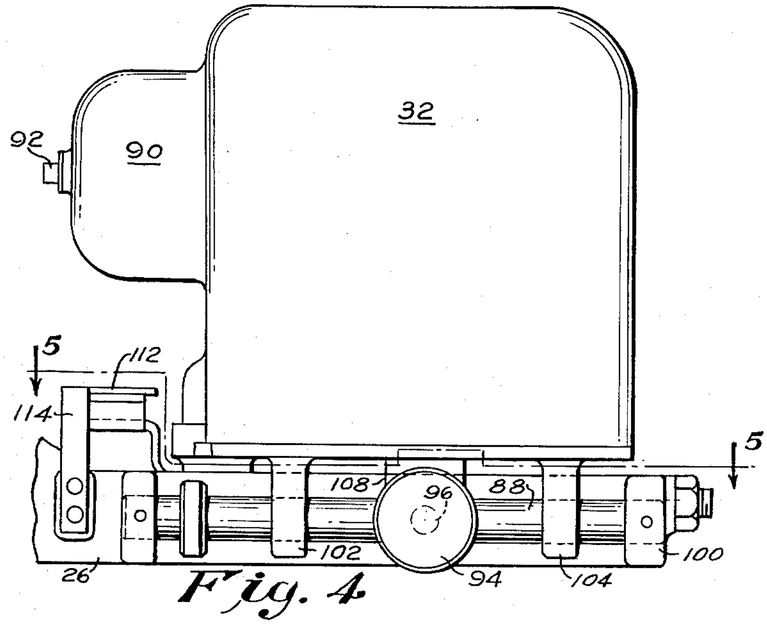
Fig. 4 is a side elevation of a portion of the apparatus of Fig. 1, showing in greater detail the mounting of one of the transducer assemblies.
Figure 5:
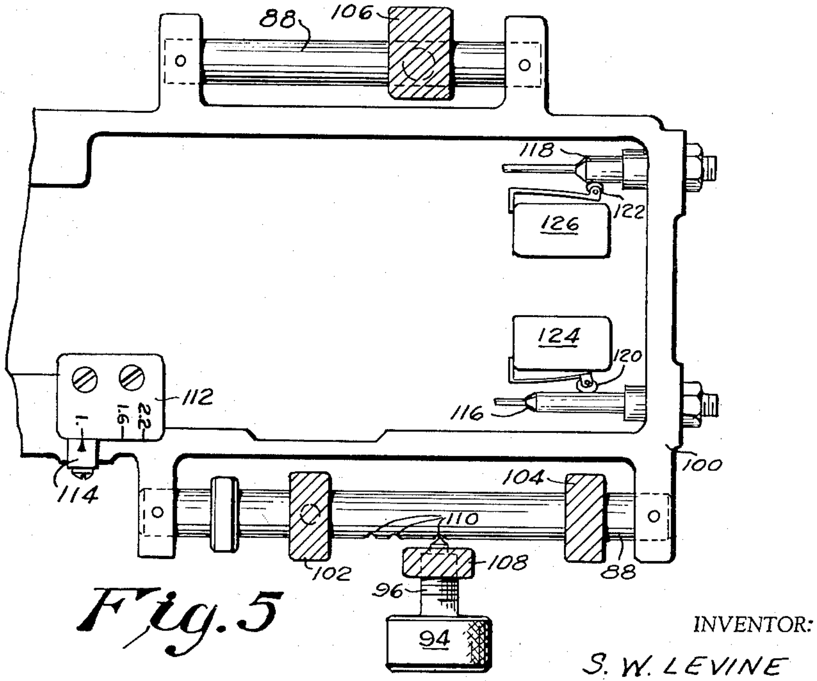
Fig. 5 is a sectional view taken along line 5—5 in Fig. 4.

The means for mounting transducer 32 on carriage 26 are shown in Figs. 4 and 5. Referring to those two figures together, it may be seen that the rods 88 are supported by a framework 100 which forms a part of carriage 26. Slidably mounted on rods 88 are a plurality of support members 102, 104 and 106 each having an aperture for receiving one or the other of rods 88. These support members form a part of the housing of transducer 32, as does the threaded member 96 which is carried by depending lug 108. Threaded member 96 is aligned with the adjacent rod 88 so that rotation of knob 94 causes threaded member 96 to bear against the rod. Where a plurality of desired ratios of reproduction are predetermined, detents such as indicated at 110 may be provided at the appropriate points along the rod 88, and the threaded member 96 is thereby easily positioned at the desired point. A scale corresponding to such predetermined points and indicating the reproduction ratio for each may be provided as at 112, the scale being carried by transducer 32. A cooperating indexing marker 114 is provided on frame 100.

Also mounted on and fixed to frame 100 are a pair of linear or translational cams 116 and 118. These cams cooperate with respective cam follower switch operators 120 and 122, each of which is associated with a respective electrical switch 124 and 126 carried by transducer 32. As transducer 32 is moved along rods 88, these switches are selectively operated to provide automatic control of the period of operation of the clamping means 42 and 62 in accordance with the diameter of a particular drum 12 which may be placed upon shaft 22.

Figure 6:
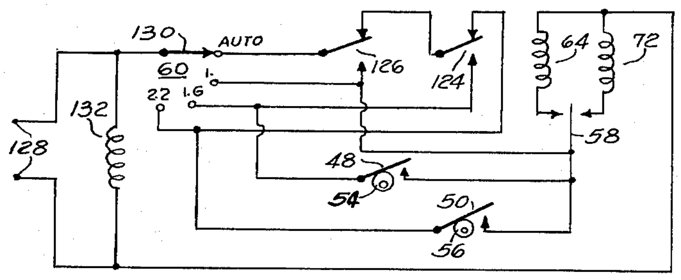
Fig. 6 is a schematic diagram of one form of electrical control circuit for the apparatus of the invention.

Fig. 6 shows a preferred form of an electrical control circuit for governing the operation of the solenoids 64 and 72. By means of the circuit as shown, the reproduced image on recording drum 10 may bear a ratio of either 2.2, 1.6 or unity to the size of the original image on copy drum 12, the particular ratio may be chosen manually or automatically in accordance with the positioning of transducer 32 on carriage 26, and the reproduced image may be a direct or a mirror copy of the original. It will be apparent that the particular ratios stated above are merely exemplary, and any others within the design limits of the machine may equally well be chosen.

The input terminals 128 are adapted to be connected to any suitable source of voltage. Connected to one of these terminals is the movable contact 130 of selector switch 60. Reading clock-wise, the stationary terminals of switch 60 are labeled "automatic," "1," "1.6" and "2.2," indicating the aforementioned size ratios of reproduction and an automatic position. The "automatic" contact is connected to the movable contact of switch 126 on transducer 32. The upper stationary contact of switch 126 is connected to the moveable contact of switch 124, and the lower stationary contact of switch 126 is connected to the "1" stationary contact of selector switch 60. The lower stationary contact of cam-operated switch 124 is connected to the "1.6" stationary contact of selector switch 60, while the upper stationary contact of switch 124 is connected to the "2.2" stationary contact of the selector switch.

The "1" stationary contact of selector switch 60 is connected to the movable contact of directional switch 58 and to the stationary contacts of rotary-cam-operated switches 48 and 50. The movable contacts of these switches are respectively connected to the "1.6" and "2.2" contacts of selector switch 60. One end of each of the solenoids 64 and 72 is connected to a respective one of the stationary contacts of switch 58, and the other ends of the solenoids are connected together and to the other of the input terminals.

In order to maintain carriage 26 at a given position while neither of the solenoids is energized, a third solenoid 132 may be provided having pole pieces adjacent some elongate fixed frame member for stationary clamping. In Fig. 6 this solenoid is shown connected directly across the input terminals, and is thus constantly energized. If solenoid 132 is of sufficiently few turns, this arrangement provides for energization of solenoid 132 to clamp carriage 26 to the aforementioned frame member (not shown) while neither of the other solenoids is energized, but when either of solenoids 64 and 72 (each having many more turns than solenoid 132) is energized, the greater force then exerted overcomes the clamping effect of solenoid 132, and carriage 26 would be carried along by belt 38.

Figure 7:
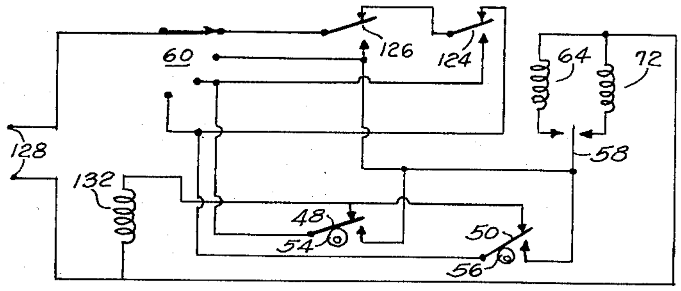
Fig. 7 is a schematic diagram of another form of electrical control circuit alternative to that of Fig. 6.
Figure 8:
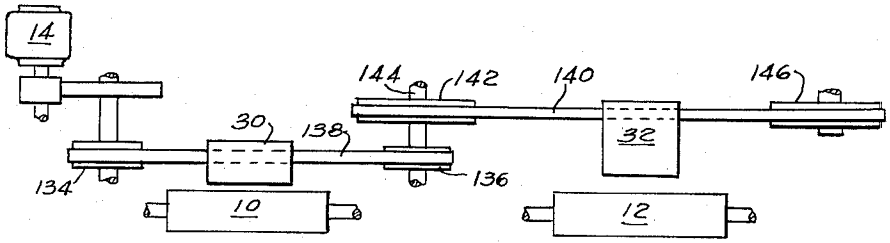
Fig. 8 is a schematic representation of an alternative translational drive for the transducer assemblies.

An alternative arrangement to the circuit of Fig. 6 is shown in Fig. 7. Here the braking solenoid 132 is energized only when neither of the drive solenoids is energized. This is accomplished by means of an additional stationary contact for each of switches 48 and 50, such additional contacts both being connected to one end of solenoid 132 and being engaged by the respective movable contact only when the circuits to solenoid 64 and 72 are broken by lifting the movable contact away from the original stationary contact. In other respects, the circuitry of Fig. 7 is identical to that of Fig. 6.

Where it is desired to make a reproduction that is a reduction of original image on drum 12, the arrangement indicated schematically in Fig. 8 may be employed. As shown, the motor 14 provides translational movement for transducer 30 in a manner similar to that of the preceding figures through suitable gearing to a drive wheel 134 which cooperates with idler 136 to provide motion for belt 138 to which transducer 30 is secured. Belt 138 thus approximates the function of belt 38 of the previous figures, except that only transducer 30 is attached thereto. Transducer 32 is now attached to a second belt 140 which is driven by the first belt 138 but at a greater speed due to the fact that the drive pulley 142 on the shaft 144 with idler 136 is of a greater diameter than either of wheels 134 and 136. As a matter of convenience, idler pulley 146 is of the same size as drive wheel 142. Since belt 140 travels faster than belt 138, if transducer 32 is clamped thereto continuously it will complete a scan along the length of drum 12 in less time than will transducer 30 along its drum 10, effecting a reduction in the reproduction of the drum 12 image. As transducer 32 is selectively clamped to its belt less and less of the time in the manner described above in connection with the previous figures, a point will be reached where the reproduction ratio will be unity. Even less clamp-time for transducer 32 will result in an enlargement as before.

Referring now to the operation of that part of the apparatus shown to which the present invention particularly pertains, a drum 12 having the desired diameter (when compared to that of the recording drum 10) is placed on shaft 22 by first pulling sleeve 84 to the right as viewed in Fig. 2, and then positioning the drum over the two conical mounts 80 and 82. A spring means (not shown) holds mount 82 in firm contact with drum 12, and the latter is thereby held firmly against mount 80. A sheet of copy material is placed upon drum 12 and secured thereto by means of bar 86 as previously described.

If selector switch 60 is in the "automatic" position, then the positioning of transducer 32 relative to carriage 26 for proper distance from the periphery of drum 12 will automatically operate the switches 126 and 124 to their proper condition to connect the appropriate one of the cam-operated switches 48, 50 in the control circuit. Otherwise, selector switch 60 is manually set to the proper ratio setting to connect the appropriate switch 48 or 50 in the circuit. As shown in Fig. 6, selector switch 60 is in the automatic position, and transducer 32 has been positioned to operate switches 126 and 124 so as to connect switch 50 in the circuit. Depending upon whether a mirror or direct reproduction is desired, directional switch 58 is operated to connect solenoid 72 or solenoid 64, respectively, in the circuit.

As motor 14 operates, the two drums 10 and 12 rotate synchronously, and belt 38 travels continuously while carrying transducer 30 along the length of recording drum 10. With selector switch 60 and linear-cam-operated switches 124 and 126 in the positions shown in Fig. 6, rotary-cam-operated switch 50 will close the control circuit to the one of the solenoids selected by directional switch 58 for a period during each rotational cycle of the operation of the drums 10 and 12 corresponding to a 2.2 to one enlargement ratio.

It will be understood that one reason for providing a manual selection of the switches 48 and 50 is to allow for deliberate distortion of the reproduced image, as for art work, by the manual selection of a ratio for the direction along the axis of the drums which does not correspond to the ratio between the diameters of the recording drum 10 and the selected copy drum 12.

The operation of the apparatus of the invention when the several switches are operated into positions differing from those described in the above operative description will be obvious to those skilled in the art. Also, the operation of the variation shown in Fig. 8 has already been explained in connection with the description of that figure.

The invention has been described above in considerable detail, and particularly with reference to its application to the reproduction of images by means of photoelectric sensing means and heated-stylus means for creating an engraving in vertical relief. However, it will be apparent to those skilled in the art that the invention is equally applicable to other machines of this general nature having pick-up means other than photoelectric and recording means other than vertical engraving. As mentioned previously, for example, the recording means may equally well take the form of a magnetic recording head, or may comprise some suitable means for producing a photographic record. Hence, the invention is not to be considered as limited to the particular details given, nor to the specific application to which reference has been made during the description of the apparatus, except insofar as may be required by the scope of the appended claims.

What is claimed is:

1. An apparatus for the electrical reproduction of images, comprising a pair of cylindrical drums mounted for rotation about their respective axes, image-information transducer means mounted adjacent each of said drums for sliding motion parallel to the axis of such drum, an electrical circuit connected between said transducer means, means on one of said drums for releasably securing thereto image-bearing sheet material, means on the other of said drums for releasably securing thereto recording sheet material upon which it is desired to reproduce such images, means for rotating said drums synchronously, means for moving the transducer means adjacent a first of said drums in timed relation to the rotation thereof, engaging means on the transducer means adjacent the second of said drums operable to engage the said means for moving said transducer means adjacent said first drum, and means mounted for rotation with said second drum and adapted to actuate said engaging means during a selected portion of each cycle of rotation of said second drum.

2. An apparatus for the electrical reproduction of images, comprising a pair of cylindrical drums mounted for rotation about parallel axes, image-information transducer means mounted adjacent each of said drums for sliding motion parallel to the axis of such drum, an electrical circuit connected between said transducer means, means on one of said drums for releasably securing thereto image-bearing sheet material, means on the other of said drums for releasably securing thereto recording sheet material upon which it is desired to reproduce such images, an axle for a first of said drums, motive power means for rotating said axle, a pair of rotary wheels, an endless belt member passing over and extending between said pair of wheels, one of the reaches of said belt member being substantially parallel to said axes and secured to the transducer means adjacent said first drum, means connecting one of said wheels to said motive power means to cause rotation of the former in timed relation with the rotation of said axle, an axle for the second of said drums, clutch means adapted to interconnect said axles to effect rotation of said second drum upon rotation of said first drum, clamp means secured to the transducer means adjacent said second drum and operable to clamp such transducer means to said endless belt member, and means mounted for rotation with said second drum and adapted to actuate said clamp means during a selected portion of each cycle of rotation of said second drum.

3. An apparatus for the electrical reproduction of images, comprising a pair of cylindrical drums mounted for rotation about parallel axes, image-information transducer means mounted adjacent each of said drums for sliding motion parallel to the axis of such drum, an electrical circuit connected between said transducer means, means on one of said drums of releasably securing thereto image-bearing sheet material, means on the other of said drums for releasably securing thereto recording sheet material upon which it is desired to reproduce such images, an axle for a first of said drums, motive power means for rotating said axle, a pair of rotary wheels, an endless belt member passing over and extending between said pair of wheels, one of the reaches of said belt member being substantially parallel to said axes and secured to the transducer means adjacent said first drum, means connecting one of said wheels to said motive power means to cause rotation of the former in timed relation with the rotation of said axle, an axle for the second of said drums, clutch means adapted to interconnect said axles to effect rotation of said second drum upon rotation of said first drum, a solenoid secured to the transducer means adjacent said second drum and having a reciprocal armature adapted to clamp such transducer means to said endless belt member upon energization of said solenoid, an electrical circuit for energizing said solenoid, and means on the axle of said second drum for energizing said circuit during a portion of each cycle of rotation of such axle.

4. An apparatus for the electrical reproduction of images in accordance with claim 3, and a pair of aligned clamp members on said last-mentioned transducer means between which passes one reach of said endless belt member, one of said clamp members being flexible and in the path of travel of said armature whereby the said belt member is clamped between said clamp members upon energization of said solenoid.

5. An apparatus for the electrical reproduction of images in accordance with claim 3, wherein said means on the axle of said second drum comprises selectable effective-length cam means and a cooperating switch in said circuit, whereby the percentage of each cycle of rotation of said last-mentioned axle during which said switch is closed may be selectively adjusted.

6. An apparatus for the electrical reproduction of images, comprising a pair of cylindrical drums mounted for rotation about parallel axes, image-information transducer means mounted adjacent each of said drums for sliding motion parallel to the axis of such drum, an electrical circuit connected between said transducer means, means on one of said drums for releasably securing thereto image-bearing sheet material, means on the other of said drums for releasably securing thereto recording sheet material upon which it is desired to reproduce such images, an axle for a first of said drums, motive power means for rotating said axle, a pair of rotary wheels, an endless belt member passing over and extending between said pair of wheels, one of the reaches of said belt member being parallel to said axes and secured to the transducer means adjacent said first drum, means connecting one of said wheels to said motive power means to cause rotation of the former in timed relation with the rotation of said axle, an axle for the second of said drums, clutch means adapted to interconnect said axles to effect rotation of said second drum upon rotation of said first drum, a solenoid secured to the transducer means adjacent said second drum and having a reciprocal armature adapted to clamp such transducer means to said endless belt member upon energization of said solenoid, an electrical circuit including a plurality of pairs of series-connected switch means for energizing said solenoid, said pairs being connected in parallel, a like plurality of axially spaced cam members on said axle of said second drum each aligned with and adapted to operate one of each pair of said switch means, the operating surfaces of said cam members each being of a different length whereby the several switch means are operated for differing percentages of each cycle of rotation of said last-mentioned axle, and means for operating a selected one of the other ones of each pair of switch means.

7. An apparatus for the electrical reproduction of images, comprising a pair of cylindrical drums mounted for rotation about their respective axes, image-information transducer means mounted adjacent each of said drums for sliding motion parallel to the axis of such drum, an electrical circuit connected between said transducer means, means on one of said drums for releasably securing thereto image-bearing sheet material, means on the other of said drums for releasably securing thereto recording sheet material upon which it is desired to reproduce such images, means for rotating said drums synchronously, means for moving the transducer means adjacent a first of said drums in timed relation to the rotation thereof, a pair of clamp means on the transducer means adjacent the second of said drums operable respectively to engage different respective portions of said means for moving said transducer means adjacent said first drum, actuating means mounted for rotation with said second drum and adapted to actuate a selectable one of said clamp means during a portion of each cycle of rotation of said second drum, and control means interconnecting said actuating means and said clamp means and adapted to cause said actuating means to actuate a selected one of said clamp means.

8. An apparatus for the electrical reproduction of images, comprising a pair of cylindrical drums mounted for rotation about parallel axes, image-information transducer means mounted adjacent each of said drums for sliding motion parallel to the axis of such drum, an electrical circuit connected between said transducer means, means on one of said drums for releasably securing thereto image-bearing sheet material, means on the other of said drums for releasably securing thereto recording sheet material upon which it is desired to reproduce such images, an axle for a first of said drums, motive power means for rotating said axle, a pair of rotary wheels, an endless belt member passing over and extending between said pair of wheels, both reaches of said belt member being parallel to said axes, said transducer means adjacent said first drum being attached to one of said reaches, means connecting one of said wheels to said motive power means to cause rotation of the former in timed relation with the rotation of said axle, an axle for the second of said drums, clutch means adapted to interconnect said axles to effect rotation of said second drum upon rotation of said first drum, first and second clamp means secured to the transducer means adjacent said second drum, said first clamp means being operable to clamp such transducer means to one reach of said endless belt member, said second clamp means being operable to clamp such transducer means to the other reach of said endless belt member, actuating means mounted for rotation with said second drum and adapted to actuate a selectable one of said clamp means during a portion of each cycle of rotation of said second drum, and control means interconnecting said actuating means and said first and second clamp means and adapted to cause said actuating means to actuate a selected one of said clamp means.

9. An apparatus for the electrical reproduction of images, comprising a pair of cylindrical drums mounted for rotation about parallel axes, image-information transducer means mounted adjacent each of said drums for sliding motion parallel to the axis of such drum, an electrical circuit connected between said transducer means, means on one of said drums for releasably securing thereto image-bearing sheet material, means on the other of said drums for releasably securing thereto recording sheet material upon which it is desired to reproduce such images, an axle for a first of said drums, motive power means for rotating said axle, a pair of rotary wheels, an endless belt member passing over and extending between said pair of wheels, both of the reaches of said belt member being parallel to said axes, said transducer means adjacent said first drum being secured to one of said reaches, means connecting one of said wheels to said motive power means to cause rotation of the former in timed relation with the rotation of said axle, an axle for the second of said drums, clutch means adapted to interconnect said axles to effect rotation of said second drum upon rotation of said first drum, first and second solenoids secured to the transducer means adjacent said second drum each having a reciprocal armature adapted to clamp such transducer means to respective reaches of said endless belt member upon energization of a selectable one of said solenods, an electrical circuit including said solenoids, a selector switch and an actuating switch, means on the axle of said second drum for closing said actuating switch during a portion of each cycle of rotation of such axle, and means for setting said selector switch to connect said actuating switch to a selected one of said solenoids.

10. An apparatus for the electrical reproduction of images, comprising a pair of cylindrical drums mounted for rotation about parallel axes, means on one of said drums for releasably securing thereto image-bearing sheet material, means on the other of said drums for releasably securing thereto recording sheet material upon which it is desired to reproduce such images, carriage means mounted adjacent each of said drums for sliding motion parallel to the axis of such drum, first image-information transducer means secured to the carriage means adjacent a first of said drums, second image-information transducer means mounted on the carriage means adjacent a second of said drums for sliding motion relative thereto in a direction substantially perpendicular to the direction of said sliding motion of such carriage means, an electrical circuit connected between said transducer means, an axle for said first drum, motive power means for rotating said axle, a pair of rotary wheels, an endless belt member passing over and extending between said wheels, both of the reaches of said belt member being parallel to said axes, said carriage means adjacent said first drum being secured to one of said reaches, means connecting one of said wheels to said motive power means to cause rotation of the former in timed relation with the rotation of said axle, an axle for the second of said drums, clutch means adapted to interconnect said axles to effect rotation of said second drum upon rotation of said first drum, first and second solenoids secured to the carriage means adjacent said second drum each having a reciprocal armature adapted to clamp such carriage means to respective reaches of said endless belt member upon energization of a selectable one of said solenoids, an electrical circuit including selector switch means having a movable contact and a plurality of stationary contacts, a plurality of first cam-operated switches each having a movable and a stationary contact, a corresponding plurality of second cam-operated switches each having a movable contact and a pair of stationary contacts, a first of the stationary contacts of said selector switch means being connected to the movable contact of a first of said plurality of second cam-operated switches, the movable contact of a second of said plurality of second switches being connected to one of the stationary contacts of said first of said plurality of second switches, the movable contact of each succeeding one of said plurality of second switches being connected to one of the stationary contacts of the next preceding one of such plurality, one of the stationary contacts of the last of said plurality of second switches being connected to a second of the stationary contacts of said selector switch means and to one of the contacts of a first of said plurality of first cam-operated switches, the other stationary contact of another of said plurality of second switches being connected to a third of the stationary contacts of said selector switch means and to the movable contact of a third switch means having such movable contact and a pair of stationary contacts, the other stationary contacts of each of the others of said plurality of said second switches being connected to respective other ones of said stationary contacts of said selector switch means, one of the contacts of each of the other of said plurality of first switches being connected to a respective one of said other ones of said stationary contacts of said selector switch means, the other contacts of each of said plurality of first switches all being connected to said third one of the stationary contacts of said selector switch means, one end of each of said solenoids being connected to a respective one of the stationary contacts of said third switch means, the other ends of said solenoids being connected together, input terminals connected to said common connection between said solenoids and to said movable contact of said selector switch means, a rotary cam actuator for each of said plurality of first cam-operated switches mounted for rotation with the axle of said second drum, the several rotary cams having cam surfaces of differing lengths whereby said first switches are actuated during correspondingly differing portions of each cycle of rotation of the axle of said second drum, a translational cam actuator for each of said plurality of second cam-operated switches mounted on the said carriage means adjacent said second drum, said plurality of first switches being mounted for translational movement with said second transducer means, said translational cams being relatively displaced in the said direction of relative motion between said second transducer means and said carriage means adjacent said second drum whereby said plurality of second switches are selectively operated in accordance with position of said second transducer means relative to the carriage means adjacent said second drum.

11. An apparatus for the electrical reproduction of images, comprising a pair of cylindrical drums mounted for rotation about their respective axes, means on one of said drums for releasably securing thereto image-bearing sheet material, means on the other of said drums for releasably securing thereto recording sheet material upon which it is desired to reproduce such images, carriage means mounted adjacent each of said drums for sliding motion parallel to the axis of such drum, image-information transducer means mounted on each said carriage means, an electrical circuit connected between said transducer means, means for rotating said drums synchronously, first translational drive means for moving the carriage means adjacent a first of said drums in timed relation to the rotation thereof, second translational drive means driven by said first drive means but at a rate greater than that of said first drive means, engaging means carried by the carriage means adjacent the second of said drums operable to engage said second drive means, and means mounted for rotation with said second drum adapted to actuate said engaging means during a selected portion of each cycle of rotation of said second drum.

12. In electromechanical image duplicating apparatus of the type including synchronously rotated copy and reproduction drums each having an associated transducer carriage and including power drive means connected to each carriage to progress the same axially alongside their respective cylinders at rates bearing a predetermined relation to the peripheral speeds of the respective cylinders, the improvement which comprises means controlled by the rotation of one of said cylinders for periodically disconnecting the drive means of its associated transducer carriage during a selected fraction of each revolution of said one of said cylinders.

References Cited in the file of this patent

UNITED STATES PATENTS

| | | |
|---|---|---|
| Re. 23,914 | Boyajean | Dec. 21, 1954 |
| 2,511,121 | Murphy | June 13, 1950 |